M. H. KANE.
METER RECORD.
APPLICATION FILED MAR. 6, 1911.
1,021,317.
Patented Mar. 26, 1912.
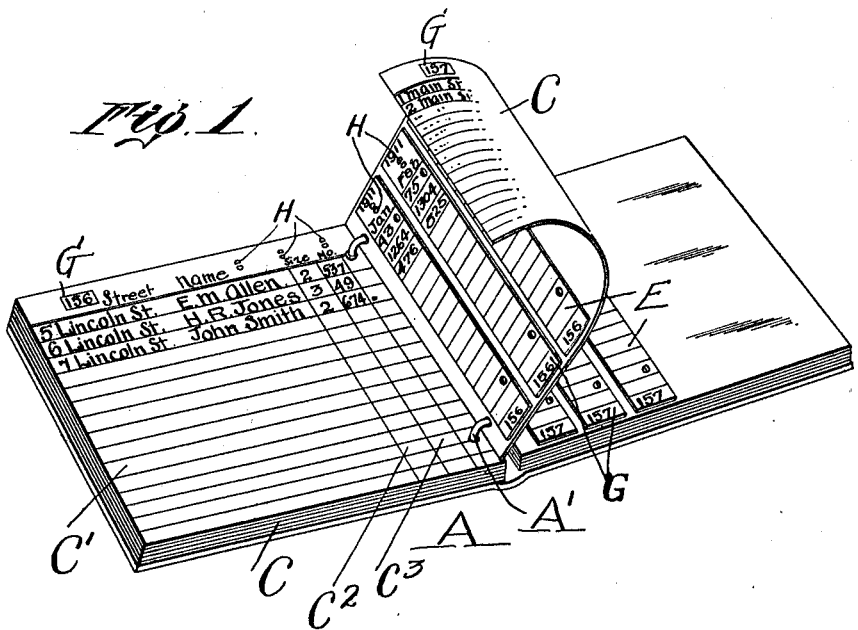
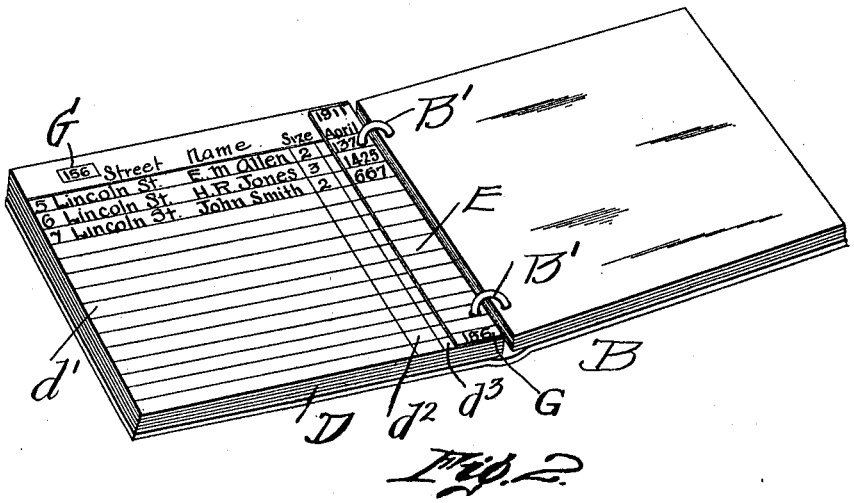

UNITED STATES PATENT OFFICE.

MICHAEL H. KANE, OF WORCESTER, MASSACHUSETTS.

METER-RECORD.

1,021,317.

Specification of Letters Patent.  Patented Mar. 26, 1912.

Application filed March 6, 1911. Serial No. 612,547.

*To all whom it may concern:*

Be it known that I, MICHAEL H. KANE, a citizen of the United States, residing at Worcester, in the county of Worcester and State of Massachusetts, have invented a new and useful Meter-Record, of which the following is a specification.

The principal objects of this invention are to provide a meter record of such a character that the meter readers will have in the book which they use nothing to indicate the readings for previous months, thus preventing the fictitious readings which are returned by some employees, and preventing the changing of readings to conceal errors; to provide a record for this purpose having very few parts, all of a simple character and all of such a nature that the readings made by the meter readers will not have to be copied, but can be transferred bodily from their books to the office books in such a way that the readings for several months can be caused to appear therein in regular order so that the differences can be found in a very simple and convenient manner.

Further objects and advantages of the invention will appear hereinafter.

Reference is to be had to the accompanying drawings in which—
Figure 1 is a perspective view of that part of an open meter record which is kept in the office arranged in accordance with this invention, and showing one leaf partly open to indicate the relation of the different leaves to each other, and Fig. 2 is a similar view showing the part of the record which the meter reader uses in making his rounds.

Water, gas, electric light companies, and the like, using meters for measuring the amount of sales to customers have had considerable difficulty in the past owing to the fact that the meter readers sometimes observe past readings and instead of going around and reading meters, insert a number which will make the reading for the month about the amount that they can estimate from the past readings. Another difficulty is that when an error has been made in reading a meter, the meter reader will sometimes notice it and purposely make a wrong reading the next time to avoid exposure. These things cause complaints and much confusion. Another difficulty encountered in the present system, on account of the meter readers carrying the books around with them, is that their books get very badly soiled so that the readings are not readily legible when they get back to the office. It is necessary also to copy the entries, thus doubling the clerical work. This invention is made for the purpose of overcoming these objections and improving the meter records in other ways as will appear hereinafter.

The meter record is shown as consisting of two parts A and B, both books or loose leaf binders. The book A is designed to be kept at the office and is shown as provided with a loose leaf connection A' of any desired character. Secured in this book by the loose leaf mechanism are a number of leaves C, each left or the rear page thereof having a column C' designated for containing the names and addresses of the customers and preferably provided with additional columns as $C^2$ and $C^3$ with headings at the top to indicate that in these columns are to be placed figures or other insignia indicating the size or number of meter or any other desired entries. These columns are divided by horizontal lines to provide spaces for entries. On the front or right these sheets are blank.

In the book or holder B are shown loose leaf devices B' on which are held a series of leaves D each having a column $d'$ and other columns $d^2$ and $d^3$ and divided off horizontally into spaces. The columns $d'$, $d^2$ and $d^3$ correspond with the columns C', $C^2$ and $C^3$ on the sheet C and have exactly the same headings; also under these headings the same entries are made so that each of these pages is an exact duplicate of one of the pages of the other book. The opposite pages preferably are blanks, but can contain entries showing the meter reader where and how to find the meters.

Adapted to be mounted adjacent to each left or front page by means of the detachable loose leaf connections B' is a loose leaf E, provided with a heading indicating the year and another heading indicating the particular month; as for example, the one shown headed "1911, April". These leaves E are placed on the leaves D in such position as to constitute in effect a column thereon. The headings are arranged at the same heights as the headings on the rear leaf of the sheet D at the left and they are divided off into spaces by horizontal lines on the same levels as the lines on the page at the left which separate the several entries.

When the meter reader is about to make his rounds for the month he is given a set of blank leaves E which are all stamped with the proper month and inserted one opposite each left hand page D in his book. The meter reader employs these leaves E in making his entries as he goes around to inspect the different meters. When he returns to the office he takes all these leaves E from his book and turns them over to the office where they are inserted in the proper position on the front sides of the sheets A as indicated in Fig. 1. For example, all the January leaves are placed in the same position on the different sheets of the book A so that the whole January index is complete, then the next month the February sheets are placed next to them and so on, making columns on the right hand pages of the book A. It will be seen that these leaves E having been placed in the book A for a number of months the office has a complete record of the meter readings and they are all on sheets which have made the rounds only once and consequently have not been subjected to as rough usage as is the case with the ordinary record book. Moreover, the only record of the past month's reading is left at the office and the meter reader does not have it at hand so that he is entirely unable to estimate from past readings the amount of water, gas or electricity which has passed through the meter during the month, and consequently he is obliged to read the meter in order to make his report.

In addition to the features of construction which have been described, each of the left hand pages C is provided with a distinguishing number or character, as for example, "G" and the corresponding left hand pages D are distinguished in like manner. When the blank leaves E are placed in the meter reader's book, he places on each one the number or character which appears on the adjacent page D, so the place of each one in the book A can be found without difficulty. The manner in which these leaves may be fastened on the sheets C can be varied within wide limits but a form of fastening H is shown which is now well known and is made by punching out a tongue from the two sheets and interlocking it in a slit simultaneously formed. After use it is not intended that these leaves E shall be removed after having once been placed in position on the leaves C.

It will be seen that while this record involves the use of two books or loose leaf holders, the whole device is really a single record, as the meter reader uses simply a duplicate of the list of names contained on the office books and temporarily places the meter readings on leaves having a certain relationship thereto, which leaves are afterward removed and placed on the official record books at the office in corresponding relation to the said duplicate leaves. It will be seen therefore that the several parts constitute a complete record, each part of which would be without great utility if any one of the parts were omitted. It is to be understood, however, that the means for fastening the leaves E in the book A and the use of loose leaf devices are optional. While loose leaf devices are necessary in the book B they can be dispensed with entirely in the book A, if desired.

While I have illustrated and described a preferred embodiment of the invention I am aware that many modifications can be made therein by any person skilled in the art without departing from the scope of my invention as expressed in the claims. Therefore, I do not wish to be limited to all the details shown and described, but What I do claim is:—

1. In a meter record or the like, the combination of two sets of books or leaf holders, one of which has alternate right and left hand pages, the left hand pages having columns, a vertical row of horizontal divisions designated at the top for containing a list of names or the like and the right hand pages having blank spaces opposite said list of names, each left hand page having a designating character, the other of which books has a plurality of leaves, the left hand faces of which are duplicates of said left hand pages in the first named book and contain the same entries in the same order, and the same designating character, and a plurality of removable leaves, each having a date, a designating character the same as that of one of said leaves, and horizontal divisions corresponding in position with the divisions of said duplicate pages adapted to be temporarily placed in the second book, each having its horizontal divisions in registration with those of one of said duplicate pages in order to receive entries and to be transferred from said book permanently to the blank space of the right hand page of the first named book, and when in each book constituting a column therein registering with the left hand page thereof, the leaves of the first named book having means for securing said temporary leaves over the blank pages thereof in a row arranged successively with respect to said dates.

2. In a meter record, the combination with a book or holder having a plurality of leaves, the pages on the left sides thereof when opened out having columns designated for containing a list of customers divided by horizontal lines, a series of temporary removable leaves of column width having horizontal lines, means for holding said temporary leaves with their horizontal lines corresponding in position with the horizontal lines on said pages, whereby entries of meter readings can be made on said temporary leaves corresponding with each of the entries on the first named leaves, and a second book or holder provided with a plurality of leaves having left hand pages, each identical with a left hand page of the first named book, the entries thereon being duplicates of those of the left hand pages of the first named book or holder, and the right hand pages being blank, and means for holding said temporary leaves on the blank pages of the second book, with the horizontal lines in horizontal registration with the horizontal lines in the left hand pages thereof.

3. In a record book, the combination with a book having a plurality of leaves provided with pages on the left side thereof, said pages having columns designated for containing a list of customers divided by horizontal lines, and provided with a series of temporary removable leaves of column width having horizontal lines corresponding in position with the horizontal lines on said pages, means for holding said temporary leaves in position, whereby entries can be made on said temporary leaves corresponding with each of the entries on the first named leaves, and a second book or holder provided with a plurality of leaves all alike, the left hand pages thereof being duplicates of the left hand pages of the first named leaves in the first named book or holder, means for holding said temporary leaves on the blank pages of the second book with the horizontal lines in horizontal registration with the horizontal lines in the left hand pages thereof, each of the left hand pages of both books having a designating number or character thereon, those on each page being the same as those on the duplicate page of the other book, and the same designating character being placed on each removable leaf while in the first named book, whereby its position in the second book will be fixed.

In testimony whereof I have hereunto set my hand, in the presence of two subscribing witnesses.

MICHAEL H. KANE.

Witnesses:
 ALBERT E. FAY,
 E. M. ALLEN.

Copies of this patent may be obtained for five cents each, by addressing the "Commissioner of Patents, Washington, D. C."